US012387061B1

(12) United States Patent
DiGregorio et al.

(10) Patent No.: US 12,387,061 B1
(45) Date of Patent: Aug. 12, 2025

(54) SHARING AN IMAGE SENSOR DATA STREAM WITH AN ACTIVE ALIGNMENT SUBSYSTEM

(71) Applicant: ZEBRA TECHNOLOGIES CORPORATION, Lincolnshire, IL (US)

(72) Inventors: Joseph F. DiGregorio, Seaford, NY (US); Robert W. DiGiovanna, Shirley, NY (US); Joseph S. Slowik, Nesconset, NY (US)

(73) Assignee: Zebra Technologies Corporaion, Lincolnshire, IL (US)

( * ) Notice: Subject to any disclaimer, the term of this patent is extended or adjusted under 35 U.S.C. 154(b) by 0 days.

(21) Appl. No.: 18/731,109

(22) Filed: May 31, 2024

(51) Int. Cl.
 *G06K 7/015* (2006.01)
 *G06K 7/10* (2006.01)
(52) U.S. Cl.
 CPC ......... *G06K 7/015* (2013.01); *G06K 7/10831* (2013.01)
(58) Field of Classification Search
 CPC .................. G06K 7/015; G06K 7/10831
 See application file for complete search history.

(56) References Cited

U.S. PATENT DOCUMENTS

| 5,329,354 A * | 7/1994 | Yamamoto | G03F 9/70 356/490 |
| 2011/0001973 A1 * | 1/2011 | Polidor | G03B 21/10 356/393 |

* cited by examiner

*Primary Examiner* — Jamara A Franklin
(74) *Attorney, Agent, or Firm* — Yuri Astvatsaturov

(57) ABSTRACT

Devices, systems, and methods for sharing an image sensor data stream with an active alignment subsystem are provided. An example device includes an image sensor coupled to a first processor. The first processor is coupled to a multiplexer and the image sensor. The first processor is configured to receive an image stream from the image sensor, transmit the image stream to a second processor via the multiplexer operating in a first state, and transmit the image stream to at least one test port of the data capture device via the multiplexer operating in a second state. The multiplexer is configured to connect the second processor to the first processor when operating in the first state, and connect the at least one test port to the first processor when operating in the second state. Responsive to receiving an enable signal, the multiplexer operates in the second state, else the first state.

30 Claims, 7 Drawing Sheets

SHARING AN IMAGE SENSOR DATA STREAM WITH AN ACTIVE ALIGNMENT SUBSYSTEM

BACKGROUND

An active alignment process may be performed on a data capture device, such as an indicia reader, to align one or more optical elements (e.g., lens) of the data capture device's imaging assembly after manufacture to ensure the images captured by the data capture device are in focus, or otherwise suitable for their intended purpose (e.g., decoding of an indicia in the images, object recognition of a product in the images, etc.). The active alignment process is generally a one-time process conducted after manufacture of the imaging assembly and/or data capture device. The active alignment process includes analyzing an image stream (e.g., one or more images, video) generated by the imaging assembly in real-time using an active alignment subsystem. Based on the image stream, adjustments to the position and/or other aspects of the optical element are made until the image stream being captured is of a suitable quality (e.g., in-focus images). Once the active alignment process is complete, the optical element may be permanently fixed in place, and the data capture device may be ready for its intended purpose and generally will not require additional active alignment.

The intended operation of the data capture device, such as an indicia reader, generally includes on-device operations such as generating an image stream via an image sensor, receiving the image stream at a first processor (e.g., a processor controlling the imaging assembly and/or other components of the indicia reader), and transmitting the image stream from the first processor to a second processor, such as a machine vision processor used to decode indicia and recognize objects in the images of the image stream. The image stream is transmitted via a limited number of input/output ports of the first processor and associated conductive paths (e.g., traces on a printed circuit board).

One or more permanent test ports used for active alignment are generally created along the one or more conductive paths between the limited number of output ports of the first processor and the input ports of the second processor carrying the image stream during intended operation of the indicia reader. The active alignment system receives the image stream via the test ports to perform active alignment. Unfortunately, the existence of the test ports in the conductive paths of the image stream may degrade or otherwise negatively impact the quality of the image stream during the intended operation of the indicia reader. For example, the test ports may cause transmission line reflections that corrupt or otherwise interfere with the quality of the image stream. Moreover, as the test ports should be positioned along the image stream conductive paths for the active alignment system to access the image stream, the potential locations for the test port(s) are limited, and the test port(s) may end up being in a hard to reach or otherwise inaccessible area respective to the active alignment subsystem (e.g., probes of the active alignment system). Further, using upgraded, more costly processors with additional unused output ports to carry the data stream for the one-time alignment process to avoid the aforementioned drawbacks, would only increases the cost of the data capture device for a process that occurs but once during the lifetime of the data capture device.

As such, devices, systems, and methods which can share the image sensor image stream of the data capture device with the active alignment subsystem without causing a degradation of the image stream during normal operation of the data capture device, and/or without requiring an upgraded processor with unused output ports, may reduce or eliminate the deleterious effects otherwise caused by the location of the test ports.

SUMMARY

In an embodiment, the present disclosure discloses a data capture device for sharing an image sensor data stream with an active alignment subsystem. The data capture device may include: (i) an image sensor coupled to a first processor; (ii) the first processor coupled to a multiplexer and the image sensor, the first processor configured to: (a) receive an image stream from the image sensor, (b) transmit the image stream from at least one output port of the first processor to a respective at least one input port of a second processor via the multiplexer operating in a first state, and (c) transmit the image stream from the at least one output port of the first processor to a respective at least one test port of the data capture device via the multiplexer operating in a second state; and (iii) the multiplexer coupled to the first processor, the second processor, and the at least one test port, the multiplexer configured to: (a) connect the at least one input port of the second processor to, and disconnect the at least one test port from, the respective at least one output port of the first processor when operating in the first state, and (b) connect the at least one test port to, and disconnect the at least one input port of the second processor from, the respective at least one output port of the first processor when operating in the second state, wherein responsive to receiving an enable signal via an enable port of the multiplexer, the multiplexer operates in the second state, else the multiplexer operates in the first state.

In a variation of the embodiment, the first processor may be configured to control an imaging assembly of the data capture device including the image sensor; and the second processor may be configured to perform one or more machine vision operations on the image stream, and does not control the imaging assembly.

In another variation of the embodiment, the at least one output port of the first processor includes at least one Mobile Industry Processor Interface (MIPI) port.

In yet another variation of the embodiment, responsive to receiving the enable signal at an enable port of the first processor, the first processor may be further configured to adjust one or more parameters of the image stream transmitted from the at least one output port of the first processor to the at least one input port of the second processor.

In still yet another variation of the embodiment, the one or more parameters include one or more of a frame rate, exposure, or gain.

In a variation of the embodiment, the data capture device may further include an optical element of an imaging assembly including the image sensor, the optical element having a position that is adjustable, wherein an output of the at least one test port is directed to an active alignment subsystem configured to adjust the position of the optical element based at least in part upon receiving the image stream via the at least one test port.

In another embodiment, the present disclosure discloses a data capture device for sharing an image sensor data stream with an active alignment subsystem. The data capture device may include: (i) an image sensor coupled to a multiplexer, the image sensor configured to provide an image stream from at least one output port of the image sensor to at least one test port via the multiplexer operating in a second state; (ii) a first processor coupled to a second processor and the multiplexer, the first processor configured to: (a) receive the image stream via at least one input port of the first processor from at least one output port of the image sensor via the multiplexer operating in a first state, and (b) transmit the image stream from the first processor to the second processor; and (iii) the multiplexer coupled to the image sensor, the first processor, and the at least one test port, the multiplexer configured to: (a) connect the at least one input port of the first processor to, and disconnect the at least one test port from, the respective at least one output port of the image sensor when operating in the first state, and (b) connect the at least one test port to, and disconnect the at least one input port of the first processor from, the respective at least one output port of the image sensor when operating in the second state, wherein responsive to receiving an enable signal via an enable port of the multiplexer, the multiplexer operates in the second state, else the multiplexer operates in the first state.

In yet another embodiment, the present disclosure discloses a system for sharing an image sensor data stream with an active alignment subsystem. The system may include: (i) an image sensor coupled to a first processor; (ii) the first processor coupled to a multiplexer and the image sensor; (iii) the multiplexer coupled to the first processor, a second processor, and at least one test port, the multiplexer configured to: (a) connect at least one input port of the second processor to, and disconnect the at least one test port from, a respective at least one output port of the first processor when operating in a first state, and (b) connect the at least one test port to, and disconnect the at least one input port of the second processor from, the respective at least one output port of the first processor when operating in a second state, wherein responsive to receiving an enable signal via an enable port of the multiplexer, the multiplexer operates in the second state, else the multiplexer operates in the first state; (iv) one or more processors; and (v) a memory storing instructions that, when executed by the one or more processors, causes the system to: (a) transmit an image stream from the image sensor to the first processor, (b) responsive to the multiplexer receiving an enable signal, provide the image stream from the at least one output port of the first processor to the at least one test port via the multiplexer operating in the second state, and (c) responsive to the multiplexer not receiving an enable signal, provide the image stream from the at least one output port of the first processor to the at least one input port of the second processor via the multiplexer operating in the first state.

In still yet another embodiment, the present disclosure discloses a system for sharing an image sensor data stream with an active alignment subsystem. The system may include: (i) an image sensor coupled to a multiplexer, the image sensor configured to provide an image stream from at least one output port of the image sensor to at least one test port via a multiplexer operating in a second state; (ii) a first processor coupled to a second processor and the multiplexer; (iii) the multiplexer coupled to the image sensor, the first processor, and at least one test port, the multiplexer configured to: (a) connect at least one input port of the first processor to, and disconnect the at least one test port from, a respective at least one output port of the image sensor when operating in a first state, and (b) connect the at least one test port to, and disconnect the at least one input port of the first processor from, the respective at least one output port of the image sensor when operating in a second state, wherein responsive to receiving an enable signal via an enable port of the multiplexer, the multiplexer operates in the second state, else the multiplexer operates in the first state; (iv) one or more processors; and (v) a memory storing instructions that, when executed by the one or more processors, causes the system to: (a) responsive to the multiplexer receiving the enable signal, provide the image stream from the at least one output port of the image sensor to the at least one test port via the multiplexer operating in the second state, and (b) responsive to the multiplexer not receiving the enable signal, (i) provide the image stream from the at least one output port of the image sensor to the at least one input port of the first processor via the multiplexer operating in the first state, and (ii) provide the image stream from the first processor to the second processor.

In another embodiment, the disclosure discloses a method for sharing an image sensor data stream with an active alignment subsystem. The method may include: (i) transmitting an image stream from an image sensor to at least one input port of a first processor of a data capture device including: (a) the image sensor, (b) a first processor coupled to a multiplexer and the image sensor, and (c) the multiplexer coupled to the first processor, a second processor, and at least one test port, the multiplexer configured to: (i) connect at least one input port of the second processor to, and disconnect the at least one test port from, a respective at least one output port of the first processor when operating in a first state, and (ii) connect the at least one test port to, and disconnect the at least one input port of the second processor from, the respective at least one output port of the first processor when operating in a second state, wherein responsive to receiving an enable signal via an enable port of the multiplexer, the multiplexer operates in the second state, else the multiplexer operates in the first state; (ii) responsive to the multiplexer receiving the enable signal, providing the image stream from the at least one output port of the first processor to the at least one test port via the multiplexer operating in the second state; and (iii) responsive to the multiplexer not receiving the enable signal, providing the image stream from the at least one output port of the first processor to the at least one input port of the second processor via the multiplexer operating in the first state.

In yet another embodiment, the disclosure discloses a method for sharing an image sensor data stream with an active alignment subsystem. The method may include: (i) transmitting an image stream from an image sensor to a multiplexer of a data capture device including: (a) the image sensor coupled to the multiplexer, (b) a first processor coupled to a second processor and the multiplexer, and (c) the multiplexer coupled to the image sensor, the first processor, and at least one test port, the multiplexer configured to: (i) connect at least one input port of the first processor to, and disconnect the at least one test port from, a respective at least one output port of the image sensor when operating in a first state, and (ii) connect the at least one test port to, and disconnect the at least one input port of the first processor from, the respective at least one output port of the image sensor when operating in a second state, wherein responsive to receiving an enable signal via an enable port of the multiplexer, the multiplexer operates in the second state, else the multiplexer operates in the first state; (ii) responsive to the multiplexer receiving the enable signal, providing the image stream from at least one output port of the image sensor to the at least one test port via the multiplexer operating in the second state; and (iii) responsive to the multiplexer not receiving the enable signal, (a) providing the image stream from the at least one output port of the image sensor to the at least one input port of the first processor via the multiplexer operating in the first state, and (b) providing the image stream from the first processor to the second processor.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
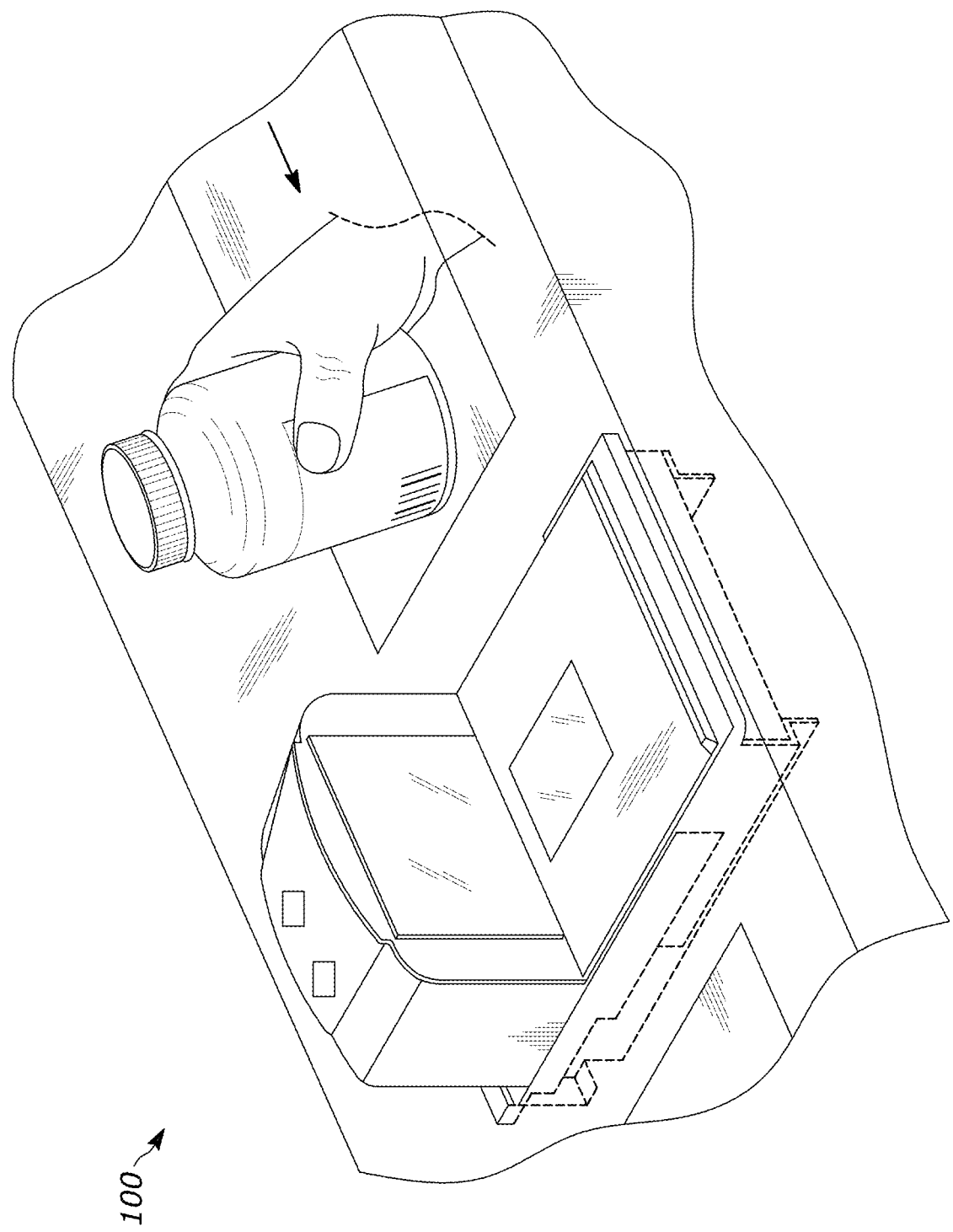
FIG. 1A is a perspective view of an example data capture device, in accordance with embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously described, locating active alignment test ports along one or more conductive paths transmitting the image stream (also referred to at times as a data stream) may result in the degradation of the image stream during intended operation of the data capture device. Therefore, it is an objective of the present disclosure to provide devices, systems, and methods capable of sharing an image sensor data stream with an active alignment subassembly without degradation of the data stream, and without requiring an upgraded and/or more costly processor to provide additional outputs used exclusively for active alignment.

More particularly, devices, systems, and methods are disclosed that include a multiplexer to provide a first output lane having first conductive path(s) to carry the data stream during the intended operation of the device when the multiplexer operates in a first state, and also provides a different output lane having second conductive paths(s) separate from the first conductive paths to carry the data stream during active alignment of the data capture device when the multiplexer operates in a second state. Absent receiving an enable signal via an enable port of the multiplexer, the multiplexer may operate in a first state connecting the first processor to the second processor, thereby creating a portion of the conductive path of the data stream from the image sensor to a first processor, and from the first processor (e.g., device controller) to the second processor (e.g., machine vision processor) via the multiplexer. In response to receiving the enable signal, the multiplexer may operate in the second state connecting the first processor to the test ports, thereby creating a portion of the conductive path of the data stream from the image sensor to the first processor, and from the first processor through the multiplexer to the test ports, where the active alignment system may receive the data stream for active alignment. Creating separate conductive paths for the data stream during intended use of the data capture device and during active alignment is technically advantageous as it alleviates the need for test ports along the conductive path of the data stream during intended operation of the data capture device. Such a configuration eliminates the deleterious effects caused by test ports on the data stream during normal operation of the data capture device, improving the overall performance of the data capture device. Moreover, the cost of using a multiplexer to create separate conductive paths for both intended operation and active alignment is a fraction of the cost compared to using an upgraded processor with additional data ports in the data capture device.

Figure 1B:
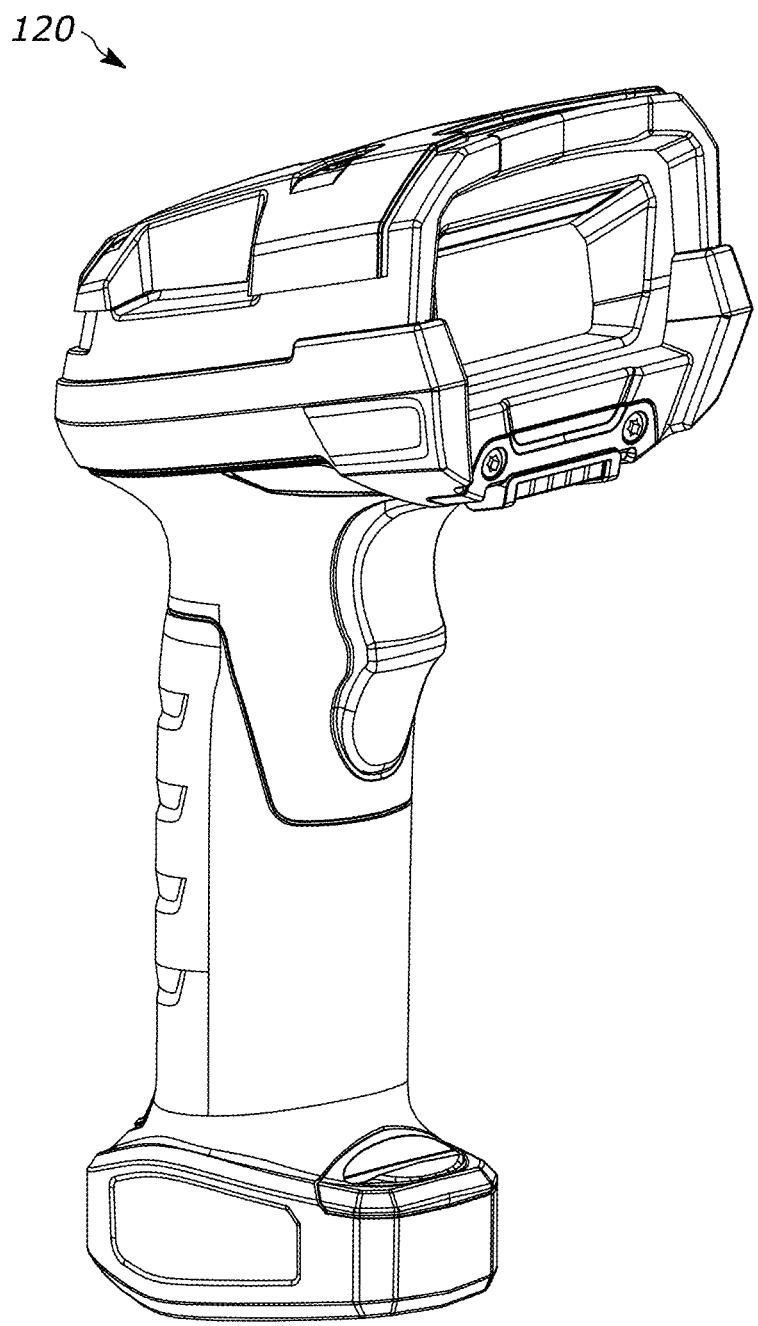
FIG. 1B is a perspective view of another example data capture device, in accordance with embodiments disclosed herein.

Turning to the Figures, FIGS. 1A and 1B each illustrate example data capture devices configured to generate image sensor data streams and suitable for active alignment. FIG. 1A is a perspective view of a bioptic indicia reader 100 data capture device. The bioptic indicia reader 100 may be configured to capture an image stream of objects passed across the field of view of its imaging assembly, and to perform operations using the data stream such as decoding a barcode on the object and/or perform object recognition of the object. FIG. 1B illustrates an example handheld indicia reader 120 data capture device which may be configured to similarly capture a data stream of its field of view, e.g., for indicia decoding or object recognition. While it will be appreciated that devices, systems, and methods disclosed may include, and/or be used in connection with, the data capture devices 100, 120 described above, this should not be considered limiting, and it should be understood that other form factors of indicia readers, and/or other data capture devices, may correspond to, encapsulate, or otherwise be associated with, the disclosed techniques.

Figure 2A:
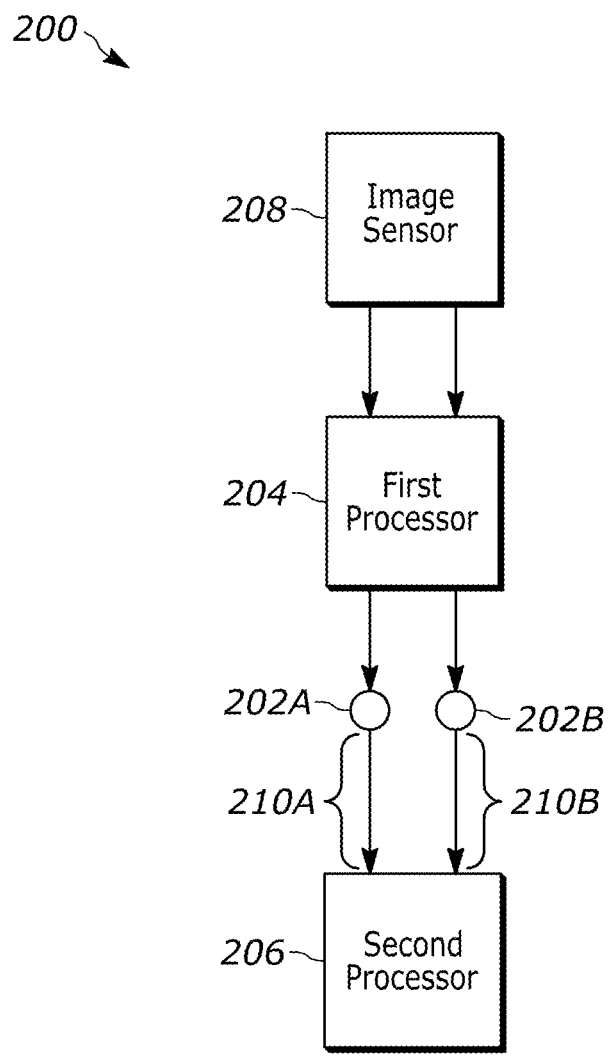
FIG. 2A is a block diagram of an example traditional data capture device, in accordance with embodiments disclosed herein.

FIG. 2A illustrates a block diagram of an example traditional data capture device 200, according to embodiments. The data capture 200 device may include test ports 202A, 202B, a first processor 204, a second processor 206, and an image sensor 208. The image sensor 208 may be configured to capture the image stream, and may be part of an imaging assembly that includes an optical component (e.g., a variable focus lens) that undergoes adjustment in position during the active alignment process. The first processor 204 may be configured to control the imaging assembly of the data capture device 200 and/or overall operation of the data capture device 200. The second processor 206 may be configured to perform machine vision operations on the image stream, and does not control the imaging assembly.

An active alignment subsystem may perform the active alignment process on the data capture device 200. The active alignment process may include adjusting the position the optical element so that the imaging assembly captures in-focus images during its intended operation. The active alignment process may include analyzing the image stream generated by the image sensor while linear actuators adjust the position of the lens of the optical assembly. For example, probes of the active alignment system may connect to the test port of the data capture device allowing the active alignment system to receive the image stream for analysis. Analysis of the image stream may occur in real-time, may be performed by the active alignment system (e.g., via an active alignment program analyzing the quality of the image stream), may be performed by a human controlling the active alignment system (e.g., displaying the image stream on a display for analysis by the human), and/or in any other suitable manner. Once the imaging assembly is sufficiently focused or otherwise aligned (e.g., via the actuators), the optical element may be fixed in placed (e.g., via a curing process). It should be understood that although an active alignment subsystem is described as adjusting the position of the optical element, the disclosed systems and methods may be used in conjunction with other alignment systems, such as a push focus system, a screw focus system, and/or other suitable alignment system that may use image data to adjust or otherwise focus an imaging assembly and/or optical element.

Creating test ports 202A, 202B for active alignment along conductive paths between the first processor 204 and the second processor 206 may cause degeneration of, or otherwise negatively impact, the data steam during the intended operation of the data capture device 200. For example, the portions 210A, 210B (referred to as transmission stubs) of the conductive paths between the test ports 202A, 202B and the second processor 206 respectively create signal issues, such as transmission line reflections, that can corrupt the image stream traveling along the conductive paths. Additionally, as the placement of the test ports 210A, 210B are along existing conductive paths, the test ports 210A, 210B may end up being located in a location inaccessible to the active alignment system.

Figure 2B:
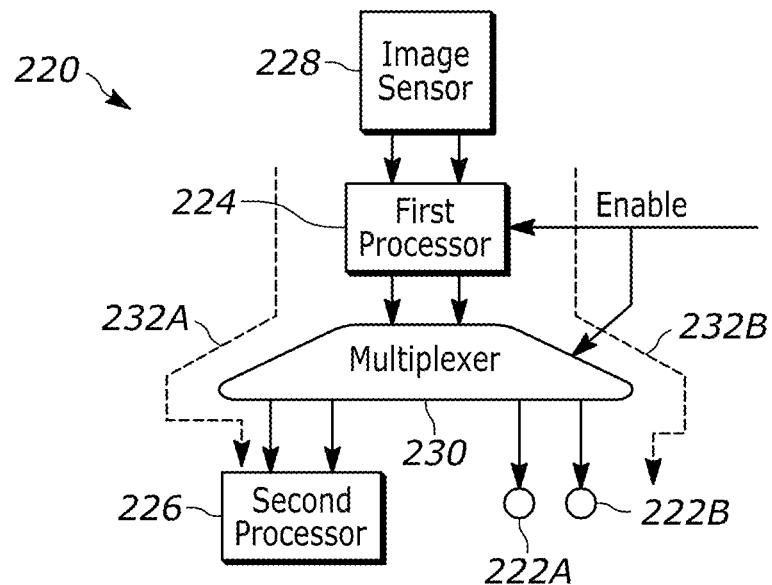
FIG. 2B illustrates a block diagram of an example data capture device for sharing an image sensor data stream with an active alignment subsystem, in accordance with embodiments disclosed herein.

FIG. 2B illustrates a block diagram of an example data capture device 220 for sharing an image sensor data stream with an active alignment subsystem, according to embodiments. The data capture device 220 may include an image sensor 228, and multiplexer 230 coupled to test ports 222A, 222B, a first processor 224, and a second processor 226. It will be understood that the example data capture device 220 may include additional, fewer, and/or alternate components.

As used herein, the term "port," such as an input port and/or output port, may refer to a single port or multiple ports. For example, although two test ports 222A, 222B are depicted in FIG. 2A, this is for ease of illustration only and the number of test ports may be greater than, equal to, or less than two test ports 222A, 222B. Moreover, referring to a port as an output port that outputs data may refer the direction of the data through the port according to the associated description, and is not meant to limit the functionality the port, or the direction of the data, as such. For example, a port described as and/or illustrated as an output port may also be capable of receiving inputs and operating as an input port. Similarly, the transmission of data described and/or illustrated as being from a first component to a second component is not meant to convey that the data is not capable of transmission from the first component to another component that is not the second component, or that the data is not capable of transmission from the second component to the first component. Furthermore, the terms "coupled," "communicatively coupled," "connects," "connected," and the like may be used interchangeably herein, e.g., to convey an electrical or other communicable connection between components. Such a connection may be a direct connection (e.g., a single conductive path directly connecting the two processors) and/or indirect connection (e.g., a conductive path connecting the two processors that runs through a multiplexer located between the two processors).

The processors 224, 226 may include one or more processors such as a microprocessor (µP), a microcontroller, a central processing unit (CPU), a graphics processing unit (GPU), and/or any suitable type of processor. The processors 224, 226 may include one or more logical processors (e.g., virtual execution unit(s) having one or more threads) and/or physical processors (e.g., hardware execution units having one or more cores), and may include multitasking and/or parallel processing. In at least some embodiments, the first processor 224 may be configured to control an imaging assembly (not shown) of the data capture device 220 including the image sensor 228, and/or control other components of the data capture device 220. In at least some embodiments, the second processor 226 may be configured to perform one or more machine vision operations on the image stream, and may not control the imaging assembly. The processors 224, 226 may include input ports and output ports, at least one of which may include a Mobile Industry Processor Interface (MIPI) port, although additional and/or other types of ports may be included, such as low voltage differential signaling (LVDS), scalable low voltage signaling (SLVS), and/or high-speed pixel interface (HiSPI) ports.

Figure 4A:
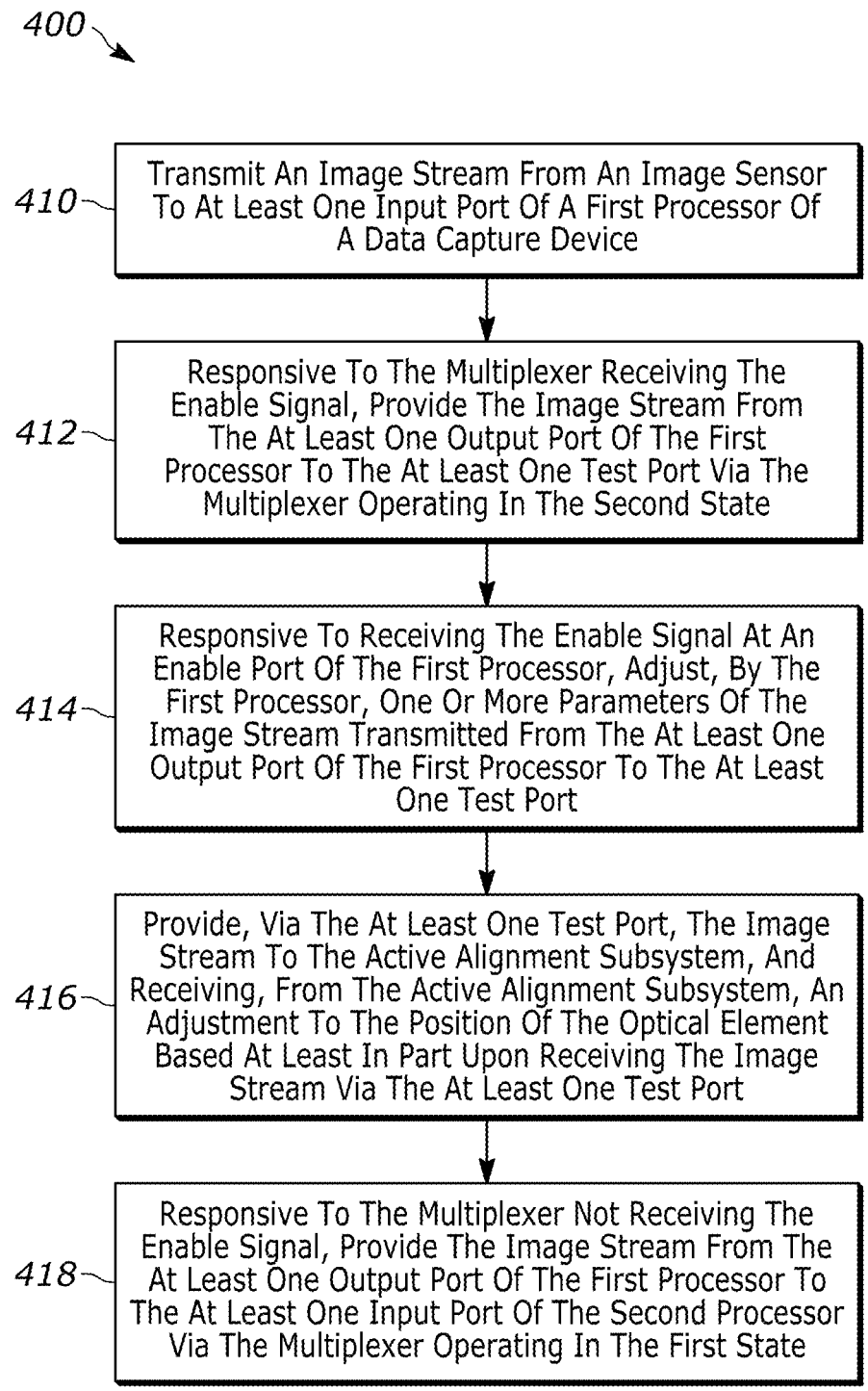
FIG. 4A illustrates a flow diagram of an example method 400 for sharing an image sensor data stream with an active alignment subsystem, in accordance with embodiments disclosed herein.

The processors 224, 226 may interact with a memory (e.g., a memory local to the data capture device 220, remote from the data capture device 220, and/or otherwise communicatively coupled to the data capture device 220) to obtain, for example, machine-readable instructions stored in the memory corresponding to, for example, the operations represented by the flowcharts of this disclosure, such as the flowcharts of FIGS. 4A and/or 4B. The processors 224, 226 may interact with the memory to obtain, or store, data and/or instructions related to the image sensor 228, the multiplexer 230, an active alignment system, and/or any other suitable component. In particular, the instructions stored in the memory, when executed by one or more of the processors 224, 226, may cause the data capture device 220 to capture an image stream, and provide the image stream the second processor 226 for analysis. Additionally, or alternatively, machine-readable instructions corresponding to the example operations described herein may be stored on one or more removable media (e.g., a compact disc, a digital versatile disc, removable flash memory, etc.) that may be coupled to the data capture device 200 to provide access to the machine-readable instructions stored thereon.

The image sensor 228 may be and/or include a charge-coupled device (CCD) sensor, a complementary metal-oxide semiconductor (CMOS) sensor, a one-dimensional array of addressable image sensors, a two-dimensional array of addressable image sensors, a monochrome sensor, a color sensor, and/or any other suitable image sensor. Depending on the implementation, the image sensor 228 may include a color sensor such as a vision camera in addition to and/or as an alternative to the monochrome sensor. The data capture device 220 may include an imaging assembly comprising the image sensor 228, and an optical element having a position that is adjustable. The active alignment subsystem and/or other suitable component may be configured to adjust the position of the optical element based at least in part upon receiving the image stream via the test ports 222A, 222B.

The multiplexer 230 may be an integrated circuit, and/or include other components, configured to receive an input signal, and when operating in a first state provides the input signal to a first output of the multiplexer 230, and when operating in a second state provides the input signal to a second output of the multiplexer 230 distinct from the first output. This configuration provides separate paths for the input signal to be output depending on the state of the multiplexer 230. The multiplexer 230 may receive each of the inputs and/or outputs via one or more ports. The multiplexer 230 may be configured to operate in the first state absent receiving an enable signal at an enable port of the multiplexer 230, and operate in the second state in response to receiving the enable signal. The multiplexer 230 may receive the enable signal from the active alignment system, the first processor 224, the second processor 226, and/or any other suitable component and/or device.

The image sensor 228 of the data capture device 220 may generate an image stream, and transmit the image stream via one or more output ports of the image sensor 228 to one or more input ports of the first processor 224. The number of ports used to transmit the data stream by the components of the data capture device 220, such as input/output ports of the image sensor 228, the first processor 224, the second processor 226, the test ports 222A, 222B, and/or the multiplexer 230 may be based upon the characteristics of the image stream (e.g., size, bandwidth, transmission rate), characteristic of the components of the data capture device 220 (e.g., clock rate, number of ports), characteristics of the data capture device 220 (e.g., power requirements), and/or any other suitable considerations. Moreover, the number of ports used to transmit the image stream may not be the same for all components of the data capture device 220. For example, the image sensor 228 may use two low-bandwidth ports to provide the image stream to the first processor 224, and the first processor 224 may use one high-bandwidth port to provide the data stream to the second processor 226.

The first processor 224 may transmit the image stream from at least one output port of the first processor 224, though the multiplexer 230. Depending on the state of the multiplexer 230, the image stream may be output by the multiplexer 230 to at least one input port of a second processor when the multiplexer 230 operates in a first state, or to the test ports 222A, 222B when the multiplexer 230 operates in a second state. Using an output path for active alignment only provides the technical advantage of mitigating the deleterious effect like signal reflection that may occur when a single output path is shared for both active alignment and intended operation of the data capture device 220.

The multiplexer 230 may operate in the first state absent of receiving the enable signal, and in the first state may be configured to connect at least one input port of the second processor 226 to, and disconnect the at least one test port 222A, 222B from, the respective at least one output port of the first processor 224. The dotted line 232A may generally illustrate the path of the data stream from the image sensor 228, to the first processor 224, and through the multiplexer 230 operating in a first state, to the second processor 226. The first state of the multiplexer 230 may be associated with the data capture device during its intended operation, for example where the second processor 226 receives the image stream for indicia decoding, object recognition, etc.

Responsive to receiving the enable signal via the enable port of the multiplexer 230, the multiplexer 230 may operate in the second state, and in the second state may be configured to connect the at least one test port 222A, 222B to, and disconnect the at least one input port of the second processor 226 from, the respective at least one output port of the first processor 224. The dotted line 232B may generally illustrate the path of the data stream from the image sensor 228, to the first processor 224, and through the multiplexer 230 operating in the second state, to the at least one test port 222A, 222B. The second state of the multiplexer 230 may be associated with the active alignment process whereby the active alignment subsystem may receive the image stream via the test ports 222A, 222B, e.g., to use the image stream to align the imaging assembly of the data capture device.

In at least some embodiments, the first processor 224 may receive the enable signal via an enable port of the first processor 224. Responsive to receiving the enable signal, the first processor 224 may be configured to adjust one or more parameters of the image stream transmitted from the first processor 224 to the at least one input port of the second processor. The parameters may include the frame rate, the exposure, the gain, and/or any other suitable parameter of the image stream. The first processor 224 may adjust the parameters when receiving the enable signal as part of, or in association with, the active alignment process, and/or for any other suitable purpose. For example, the first processor 224 may adjust parameters of the image stream in real-time during the active alignment process, wherein the adjusted parameters improve the ability of the active alignment system to perform the active alignment, such as improving the speed of the alignment process by increasing the brightness of an otherwise dark image stream used to perform the active alignment.

Figure 2C:
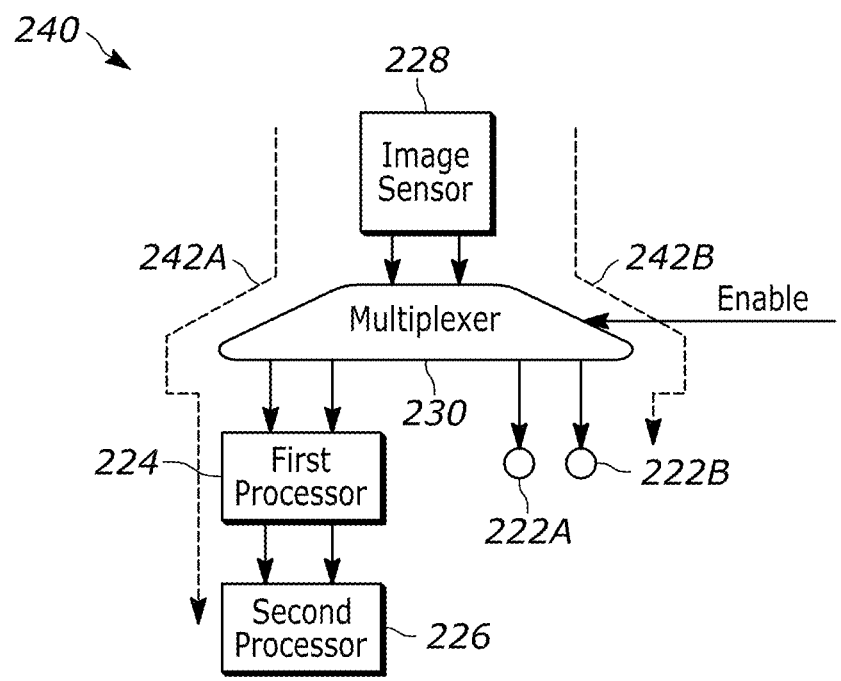
FIG. 2C illustrates a block diagram of an example data capture device for sharing an image sensor data stream with an active alignment subsystem, in accordance with embodiments disclosed herein.

FIG. 2C depicts a block diagram of an example data capture device 240 for sharing an image sensor data stream with an active alignment subsystem, according to embodiments. The data capture device 240 may be an alternate embodiment of the data capture device 220, namely an embodiment where rather than having the multiplexer 230 coupled between the first processor 224, the second processor 226 and the test ports 222A, 222B, the multiplexer 230 is coupled between the image sensor 228, the first processor 224, and the second processor 226. It will be understood that the example data capture device 240 may include additional, fewer, and/or alternate components.

The multiplexer 230 of the data capture device 240 may operate in the first state absent receiving the enable signal, and in the first state be configured to connect the at least one input port of the first processor 224 to, and disconnect the test ports 222A, 222B from, at least one output port of the image sensor 228. The dotted line 242A may generally illustrate the path of the data stream from the image sensor 228, through the multiplexer 230 operating in a first state to the first processor 224, and to the second processor 226. The first state of the multiplexer 230 may be associated with the data capture device during its intended operation, for example where the second processor 226 receives the image stream for indicia decoding, object recognition, etc.

Responsive to receiving the enable signal via the enable port of the multiplexer 230, the multiplexer 230 of the data capture device 240 may operate in the second state, and in the second state be configured to connect the test ports 222A, 222B to, and disconnect the at least one input port of the first processor 224 from, the at least one output port of the image sensor 228. The dotted line 242B may generally illustrate the path of the data stream from the image sensor 228, through the multiplexer 230 operating in the second state to the test ports 222A, 222B. The second state of the multiplexer 230 may be associated with the active alignment process whereby the active alignment subsystem may receive the image stream via the test port 222A, 222B, and use the image stream for active alignment of the imaging assembly of the data capture device 240.

The first processor 224 of the data capture device 240 is not in the communicative path between the image sensor 228 and the test ports 222A, 222B, as is the case with the data capture device 220. As a result, the first processor 224 of the data capture device 240 may not be configured to receive the enable signal, and/or may not be configured to adjust one or more parameters of the image stream responsive to receiving the enable signal. Accordingly, the data capture device 220 may provide advantages respective to its ability to adjust parameters of the image stream via the first processor 224 for active alignment purposes, which may not be possible with the data capture device 240.

Figure 3A:
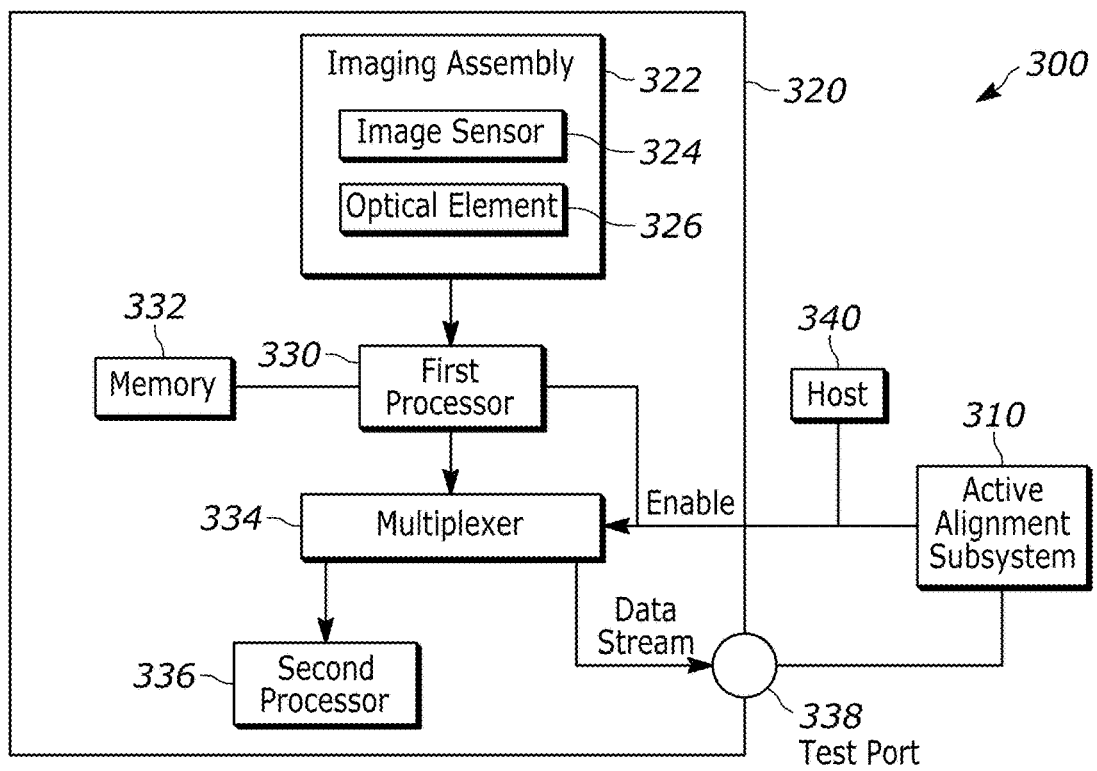
FIG. 3A depicts a block diagram of an example system 300 for sharing an image sensor data stream with an active alignment subsystem, in accordance with embodiments disclosed herein.

FIG. 3A depicts a block diagram of an example system 300 for sharing an image sensor data stream with an active alignment subsystem 310. The system 300 may include the active alignment subsystem 310, a data capture device 320, and a host 340. It will be understood that the example system 300 may include additional, fewer, and/or alternate components.

In at least some embodiments, the data capture device 320 (e.g., data capture device 220) may include an imaging assembly 322, a first processor 330 (e.g., the first processor 224), a memory 332, a multiplexer 334 (e.g., the multiplexer 230), a second processor 336 (e.g., the second processor 226), and a test port 338 (e.g., the test ports 222A, 222B). The memory 332 may be communicatively coupled to the first processor 330, and store instructions to be executed by the first processor 330. In other embodiments, the memory may be accessible by other components of the system 300 (e.g., the second processor 336, the active alignment subsystem 310, the host 340), and/or store instructions executable by other such components.

The imaging assembly 322 may include an image sensor 324 (e.g., the image sensor 228) and an optical element 326. The optical element 326 may include, for example, one or more lenses for focusing light onto the image sensor 324. In at least some embodiments, the optical element 326 may have an adjustable position, and the active alignment subsystem 310 may be configured to adjust the position of the optical element 326 based at least in part upon receiving the image stream via the test port 338 (e.g., during active alignment).

The host 340 may be a computing device communicatively coupled (e.g., via a network, a data bus, and/or other suitable communicative coupling) to the active alignment subsystem 310 and/or the data capture device 320. In one example, the host 340 may be, and/or include, a server or other computing device controlling and/or otherwise associated with the active alignment subsystem 310. In one example, the host 340 may be a point of sale system that receives one or more images of the image stream captured by the image sensor 324, such as receiving images of a product captured during customer checkout wherein the host 340 is configured to analyze the images to decode an indicia on the product, perform product recognition, etc.

Similar to the data capture device 220, in the embodiment of FIG. 3A the image sensor 324 (via the imaging assembly 322) is coupled to the first processor 330; (ii) the first processor 330 is coupled to the multiplexer 334; and (iii) the multiplexer is 334 is coupled to the second processor 336 and the test port 338. The first processor 330 may be configured to receive an image stream from the image sensor 324, for example the image stream output by the image sensor 324 via one or more output ports that is received by the first processor 330 via one or more input ports. The first processor 330 may be configured to transmit the image stream from at least one output port to: (i) a respective at least one input port of the second processor 336 via the multiplexer 334 operating in a first state; and (ii) a respective at least one test port 338 of the data capture device via the multiplexer operating in a second state.

The multiplexer 334 may receive an enable signal from a controller. The controller providing the enable signal to the multiplexer 334 may be, and/or include, the active alignment subsystem 310, the first processor 330, the host 340, and/or other suitable component. In one example, the host 340 controls the active alignment subsystem 310, and during active alignment of the imaging assembly 322, the host may provide the enable signal to the multiplexer 334 directly (e.g., via a data bus, a network, etc.), and/or indirectly such as via a command sent to the active alignment subsystem 310 that causes the active alignment subsystem 310 to provide the enable signal to the multiplexer 334. In one example, the active alignment subsystem may provide the enable signal to the multiplexer 334 during active alignment of the imaging assembly 322. In one example, the first processor 330 may be configured to provide the enable signal, e.g., based upon a user of the data capture device 320 selecting an active alignment process via a user interface of the data capture device 320. The multiplexer 334 may receive the enable signal in any suitable manner by any suitable component.

Responsive to receiving an enable signal from a controller via the enable port, the multiplexer 334 may operate in the second state wherein the multiplexer 334 connects the test port 338 to a respective output port of the first processor 330. Operating in the second state may include the multiplexer 334 disconnecting the input port of the second processor 336 from the respective output port of the first processor 330. Accordingly, in the second state the image stream captured by the image sensor 324 is provided to the test port 338 via the first processor 330 and the multiplexer 334.

The active alignment subsystem 310 may be communicatively coupled to the test port 338, e.g., via a wired connection (e.g., probes), a wireless connect, and/or any other suitable direct and/or indirect coupling. While the multiplexer is operating in the second state, the active alignment subsystem 310 may receive the image stream via the test port 338, and use the image stream for active alignment of the imaging assembly 322. For example, based upon one or more images of the image stream, the active alignment may cause the position of the optical element 326 to be adjusted until the image stream is of a suitable quality, e.g., of a quality that objects appearing in the image stream are able to be recognized and/or decoded.

It at least some embodiments, the first processor 330 may be configured to receive the enable signal (e.g., during the same time period the multiplexer 334 is receiving the enable signal) via an enable port of the first processor 330. Responsive to receiving the enable signal, the first processor 330 may be configured to adjust one or more parameters of the image stream received from the image sensor 324, and transmit the adjusted image stream via the output port of the first processor 330 to the test port 338 via the multiplexer 334 operating in the second state. For example, the first processor 330 may adjust the frame rate, the exposure, the gain, the brightness, and/or any other suitable parameter of the image stream. Such adjustments may be beneficial during the active alignment process, for example to allow the active alignment subsystem 310 to more quickly align the optical element 326 based upon the adjusted image stream.

In one example of the active alignment process via the system 300, the active alignment subsystem 310 is located at the manufacturing facility of the data capture device 320. Once the data capture device 320 is manufactured, the imaging assembly 322 may require alignment so that when the data capture device 320 is deployed for its intended use (e.g., as an indicia reader at checkout), the images captured by the imaging assembly 322 are in-focus and/or otherwise suitable for their intended purpose.

To perform the active alignment, a probe of the active alignment subsystem 310 may be coupled to the test port 338. In embodiments where the data capture device 320 includes more than one test port 338, the active alignment subsystem 310 may use multiple probes to couple to the multiple test ports 338. In the example, the first processor 330 may control operation of the data capture device 320, and the memory 332 may include an active alignment program configured for active alignment that is executed by the first processor 330. For example, the first processor 330 may automatically execute the active alignment program when the data capture device 320 is powered after manufacture and/or until the active alignment process is complete.

Upon powering on the data capture device 320, the first processor 330 may execute the active alignment program causing the image sensor 324 to capture an image stream of the field of view of the imaging assembly 322. The host 340 may control the active alignment subsystem 310. During active alignment, the first processor 330 (e.g., the active alignment program) and/or host 340 controlling the active alignment process may cause alignment patterns to be displayed on a display within the field of view of the data capture device 320. The alignment images may include patterns that the active alignment subsystem 310 receives in the image stream and uses to perform active alignment. For example, the image stream may include shapes and alphanumeric characters, and the host 340 and/or the active alignment subsystem 310 may analyze the image stream to determine whether the shapes and alphanumeric characters appear in focus (e.g., are recognizable). In such an example, the alignment patterns may appear to be out of focus due to the initial placement of the optical element 326 during manufacture. Adjustments to the optical element 326 may be made until the alignment patterns appear in focus.

The active alignment subsystem 310, the host 340, and/or other suitable component may cause the position of the optical element 326 to be adjusted, e.g., in real-time while the image stream of the alignment patterns are being provided. The position of the optical element 326 may be adjusted one or more times via mechanical actuators coupled to the optical element 326, and/or in any other suitable manner. Adjusting the position of the optical element 326 may include adjusting the optical element 326 in one or more directions inside of the imaging assembly 322, such adjustments in the leftward and rightward directions along an x-axis, upward and downward directions along a y-axis, forward and backward directions along a z-axis, and/or in any other direction, or any other suitable adjustment. It will be understood that the foregoing example is for ease of illustration only, as any suitable active alignment process may be performed. For example, the optical element 326 may be aligned based upon the quality or other characteristics of image stream, without the use of alignment patterns.

In at least some embodiments, the first processor 330 may adjust one or more parameters of the image stream during active alignment responsive to receiving the enable signal, e.g., to aid in the active alignment process. For example, the host 340, the active alignment subsystem 310, a human, and/or the data capture device 320 may determine the image stream comprises images which have an inadequate level of brightness to adequately detect alignment patterns to perform active alignment. In response, the first processor 330 may adjust the level of brightness of the image stream before transmitting the image stream to the test port 338 via the multiplexer 334 operating in the second state, to improve detection of the alignment patterns and the active alignment process.

Once the optical element 326 is suitably aligned, the optical element 326 may be fixed in position, for example using a curing process. Upon completion of the active alignment process, the controller (e.g., the host 340, the active alignment subsystem 310, the first processor 330) may cease to provide the enable signal to the multiplexer 334. In response, the multiplexer 334 may connect the input port of the second processor 336 to the respective at least one output port of the first processor 330, to operate in the first state. The first state may also include disconnecting the test port 338 from the output port of the first processor 330. The active alignment subsystem 310 may also be decoupled from the data capture device 320 upon completion of the active alignment process, e.g., the probes of the active alignment subsystem 310 connected to the test port 338 during active alignment may be removed from the test port 338.

In the second state, the image stream captured by the image sensor 324 may be provided to the second processor 336 via the first processor 330 and multiplexer 334 operating in the first state. In at least some embodiments, the data capture device 320 may be an indicia reader (e.g. indica reader 100, 120) used to capture an image stream comprising one or more images of a product, and is able to operate for its intended use while the multiplexer 334 operates in the first state. The second processor 336 may be configured to perform machine vision operations, such as indicia decoding, object recognition, etc. In such an embodiment, during intended operation the data capture device 320 may generate a payload based upon performing machine vision operations on the data stream, and provide the payload to the host 340 (e.g., a point of sale device).

Figure 3B:
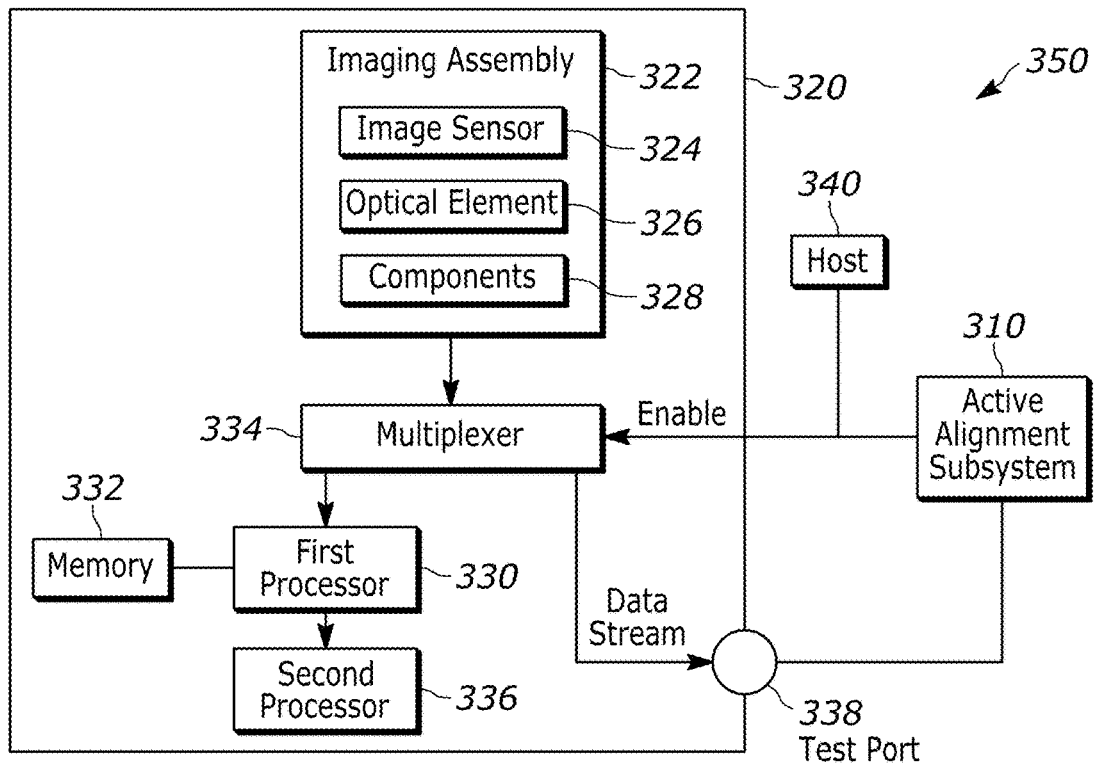
FIG. 3B depicts a block diagram of an example system 300 for sharing an image sensor data stream with an active alignment subsystem, in accordance with embodiments disclosed herein.

FIG. 3B depicts the system 350. The system 350 may be an alternate embodiment of the system 300, wherein instead of the multiplexer 334 being coupled between the first processor 330 and the second processor 336 as in the system 300, the multiplexer 334 is coupled between the image sensor 324 (via the imaging assembly 322) and the first processor 330, as similarly illustrated in FIG. 2C. Accordingly, in response to receiving the enable signal from the controller (e.g., the host 340, active alignment subsystem 310, first processor 330, etc.), the system 350 may provide the image stream from the at least one output port of the image sensor 324 to the test port 338 via the multiplexer operating in the second state.

Responsive to the multiplexer 334 not receiving the enable signal, the system 350 may provide the image stream from the at least one output port of the image sensor 324 to the at least one input port of the first processor 330 via the multiplexer 334 operating in the first state, and further provide the image stream from the first processor 330 to the second processor 336.

FIG. 4A illustrates a flow diagram of an example method 400 for sharing an image sensor data stream with an active alignment subsystem. The method 400 may be performed, for example, by the data capture device 220 and/or the system 300. The method 400 may include transmitting an image stream from an image sensor to at least one input port of a first processor of a data capture device (block 410).

The data capture device may include (i) the image sensor (e.g., the image sensor 228, 324), (ii) a first processor (e.g., the first processor 224, 330) coupled to a multiplexer (e.g., the multiplexer 230, 334) and the image sensor, and (iii) the multiplexer coupled to the first processor, a second processor (e.g., the second processor 226, 336), and at least one test port (e.g. the test port 222A, 222B, 338). The multiplexer may be configured to: (a) connect at least one input port of the second processor to, and disconnect the at least one test port from, a respective at least one output port of the first processor when operating in a first state, and (b) connect the at least one test port to, and disconnect the at least one input port of the second processor from, the respective at least one output port of the first processor when operating in a second state. Responsive to receiving an enable signal via an enable port of the multiplexer, the multiplexer may operate in the second state, else the multiplexer may operate in the first state.

The method 400 may include, responsive to the multiplexer receiving the enable signal, providing the image stream from the at least one output port of the first processor to the at least one test port via the multiplexer operating in the second state (block 412). The at least one output port of the first processor may include includes at least one Mobile Industry Processor Interface (MIPI) port.

In at least some embodiments, the method 400 may include, responsive to receiving the enable signal at an enable port of the first processor, adjusting, by the first processor, one or more parameters of the image stream transmitted from the at least one output port of the first processor to the at least one test port (block 414). The one or more parameters may include one or more of a frame rate, exposure, gain, and/or any other suitable parameter of the image stream.

In at least some embodiments of the method 400, the data capture device may include (i) an imaging assembly including the image sensor, and (ii) an optical element having a position that is adjustable, and an output of the at least one test port may be directed to an active alignment subsystem configured to adjust the position of the optical element. In such an embodiment, the method 400 may include: providing, via the at least one test port, the image stream to the active alignment subsystem, and receiving, from the active alignment subsystem, an adjustment to the position of the optical element based at least in part upon receiving the image stream via the at least one test port (block 416).

The method 400 may include, responsive to the multiplexer not receiving the enable signal, providing the image stream from the at least one output port of the first processor to the at least one input port of the second processor via the multiplexer operating in the first state (block 418 In at least some embodiments of the method 400, the first processor may be configured to control an imaging assembly of the data capture device including the image sensor, and the second processor may be configured to perform one or more machine vision operations on the image stream, and does not control the imaging assembly.

It should be understood that not all blocks of the example flowchart of FIG. 4A are required to be performed. The example flowchart may include additional, less, or alternate functionality, including that discussed elsewhere herein.

Figure 4B:
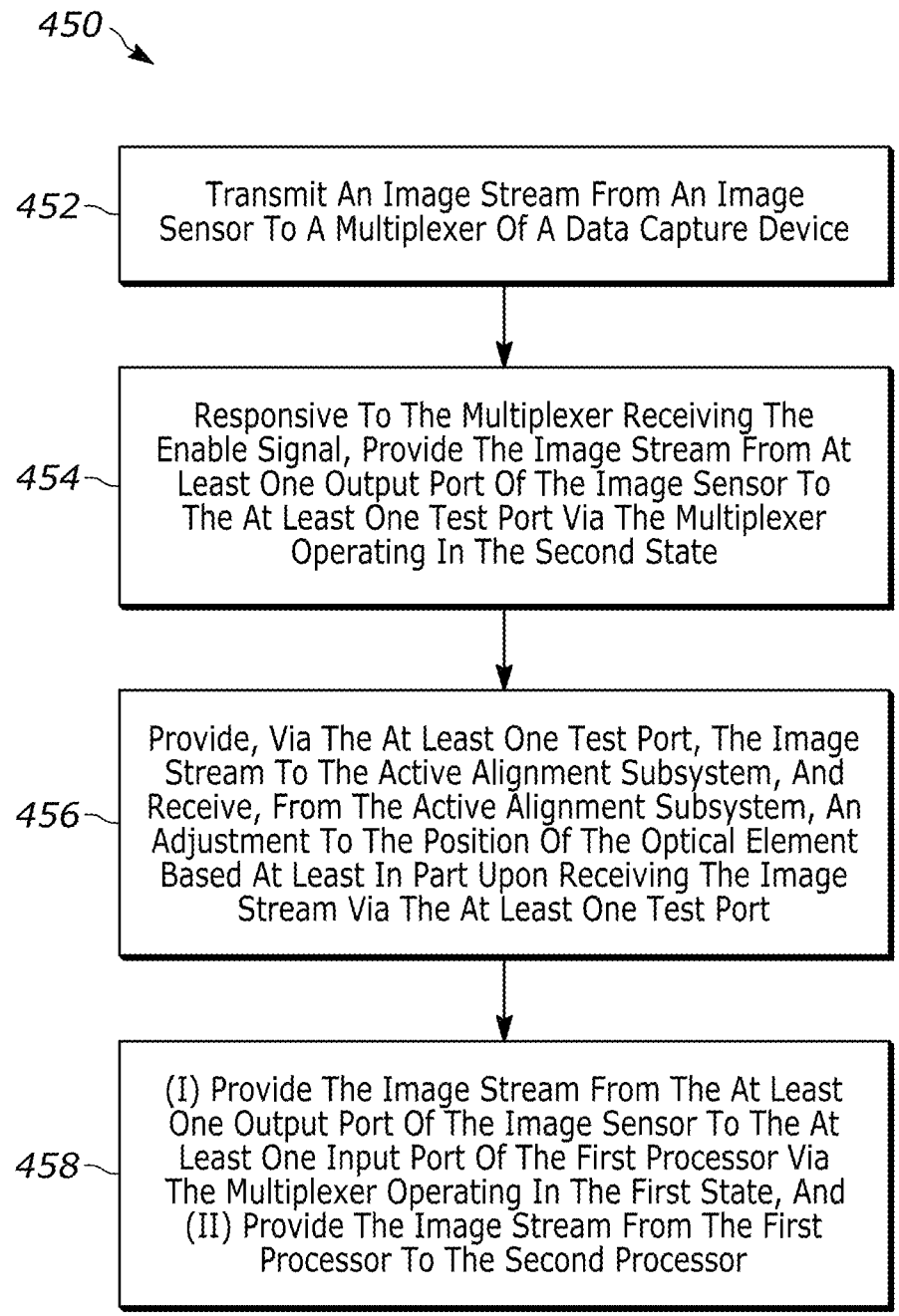
FIG. 4B illustrates a flow diagram of an example method 400 for sharing an image sensor data stream with an active alignment subsystem, in accordance with embodiments disclosed herein.

FIG. 4B illustrates a flow diagram of an example method 450 for sharing an image sensor data stream with an active alignment subsystem. The method 450 may be performed, for example, by the data capture device 240 and/or the system 350.

The method 450 may include transmitting an image stream from an image sensor to a multiplexer of a data capture device (block 452). The data capture device may include (i) the image sensor coupled to the multiplexer; (ii) a first processor coupled to a second processor and the multiplexer; and (iii) the multiplexer coupled to the image sensor, the first processor, and at least one test port. In at least some embodiments of the method 450, the first processor may be configured to control an imaging assembly of the data capture device including the image sensor, and the second processor may be configured to perform one or more machine vision operations on the image stream, and does not control the imaging assembly.

The multiplexer may be configured to: (a) connect at least one input port of the first processor to, and disconnect the at least one test port from, a respective at least one output port of the image sensor when operating in a first state, and (b) connect the at least one test port to, and disconnect the at least one input port of the first processor from, the respective at least one output port of the image sensor when operating in a second state. Responsive to receiving an enable signal via an enable port of the multiplexer, the multiplexer may operate in the second state, else the multiplexer may operate in the first state.

The method 450 may include, responsive to the multiplexer receiving the enable signal, providing the image stream from at least one output port of the image sensor to the at least one test port via the multiplexer operating in the second state (block 454).

In at least some embodiments of the method 450, the data capture device may include (i) an imaging assembly including the image sensor, and (ii) an optical element having a position that is adjustable, and an output of the at least one test port may be directed to an active alignment subsystem configured to adjust the position of the optical element. In such an embodiment, the method 450 may include: providing, via the at least one test port, the image stream to the active alignment subsystem, and receiving, from the active alignment subsystem, an adjustment to the position of the optical element based at least in part upon receiving the image stream via the at least one test port (block 456).

The method 450 may include, responsive to the multiplexer not receiving the enable signal, (i) providing the image stream from the at least one output port of the image sensor to the at least one input port of the first processor via the multiplexer operating in the first state, and (ii) providing the image stream from the first processor to the second processor (block 458). At least one output port of the first processor includes at least one Mobile Industry Processor Interface (MIPI) port.

It should be understood that not all blocks of the example flowchart of FIG. 4B are required to be performed. The example flowchart may include additional, less, or alternate functionality, including that discussed elsewhere herein.

It will be understood that the foregoing represents one potential implementation, and that other implementations may be envisioned. For example, in some implementations, a bi-optic barcode scanner may be used as the imaging device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A data capture device for sharing an image sensor data stream with an active alignment subsystem, the data capture device comprising:
    an image sensor coupled to a first processor;
    the first processor coupled to a multiplexer and the image sensor, the first processor configured to:
        receive an image stream from the image sensor,
        transmit the image stream from at least one output port of the first processor to a respective at least one input port of a second processor via the multiplexer operating in a first state, and
        transmit the image stream from the at least one output port of the first processor to a respective at least one test port of the data capture device via the multiplexer operating in a second state; and
    the multiplexer coupled to the first processor, the second processor, and the at least one test port, the multiplexer configured to:
        connect the at least one input port of the second processor to, and disconnect the at least one test port from, the respective at least one output port of the first processor when operating in the first state, and
        connect the at least one test port to, and disconnect the at least one input port of the second processor from, the respective at least one output port of the first processor when operating in the second state,
            wherein responsive to receiving an enable signal via an enable port of the multiplexer, the multiplexer operates in the second state, else the multiplexer operates in the first state.

2. The data capture device of claim 1, wherein:
the first processor is configured to control an imaging assembly of the data capture device including the image sensor; and
the second processor is configured to perform one or more machine vision operations on the image stream, and does not control the imaging assembly.

3. The data capture device of claim 1, wherein:
the at least one output port of the first processor includes at least one Mobile Industry Processor Interface (MIPI) port.

4. The data capture device of claim 1, wherein:
responsive to receiving the enable signal at an enable port of the first processor, the first processor is further configured to adjust one or more parameters of the image stream transmitted from the at least one output port of the first processor to the at least one test port.

5. The data capture device of claim 4, wherein:
the one or more parameters include one or more of: frame rate, exposure, or gain.

6. The data capture device of claim 1, further comprising:
an optical element of an imaging assembly including the image sensor, the optical element having a position that is adjustable,
    wherein an output of the at least one test port is directed to an active alignment subsystem configured to adjust the position of the optical element based at least in part upon receiving the image stream via the at least one test port.

7. A data capture device for sharing an image sensor data stream with an active alignment subsystem, the data capture device comprising:
- an image sensor coupled to a multiplexer, the image sensor configured to provide an image stream from at least one output port of the image sensor to at least one test port via the multiplexer operating in a second state;
- a first processor coupled to a second processor and the multiplexer, the first processor configured to:
  - receive the image stream via at least one input port of the first processor from at least one output port of the image sensor via the multiplexer operating in a first state, and
  - transmit the image stream from the first processor to the second processor; and
- the multiplexer coupled to the image sensor, the first processor, and the at least one test port, the multiplexer configured to:
  - connect the at least one input port of the first processor to, and disconnect the at least one test port from, the respective at least one output port of the image sensor when operating in the first state, and
  - connect the at least one test port to, and disconnect the at least one input port of the first processor from, the respective at least one output port of the image sensor when operating in the second state,
    - wherein responsive to receiving an enable signal via an enable port of the multiplexer, the multiplexer operates in the second state, else the multiplexer operates in the first state.

8. The data capture device of claim 7, wherein:
- the first processor is configured to control an imaging assembly of the data capture device including the image sensor; and
- the second processor is configured to perform one or more machine vision operations on the image stream, and does not control the imaging assembly.

9. The data capture device of claim 7, wherein:
- at least one output port of the first processor includes at least one Mobile Industry Processor Interface (MIPI) port.

10. The data capture device of claim 7, further comprising:
- an optical element of an imaging assembly including the image sensor, the optical element having a position that is adjustable,
  - wherein an output of the at least one test port is directed to an active alignment subsystem configured to adjust the position of the optical element based at least in part upon receiving the image stream via the at least one test port.

11. A system for sharing an image sensor data stream with an active alignment subsystem, the system comprising:
- an image sensor coupled to a first processor;
- the first processor coupled to a multiplexer and the image sensor;
- the multiplexer coupled to the first processor, a second processor, and at least one test port, the multiplexer configured to:
  - connect at least one input port of the second processor to, and disconnect the at least one test port from, a respective at least one output port of the first processor when operating in a first state, and
  - connect the at least one test port to, and disconnect the at least one input port of the second processor from, the respective at least one output port of the first processor when operating in a second state,
    - wherein responsive to receiving an enable signal via an enable port of the multiplexer, the multiplexer operates in the second state, else the multiplexer operates in the first state;
- one or more processors; and
- a memory storing instructions that, when executed by the one or more processors, causes the system to:
  - transmit an image stream from the image sensor to the first processor,
  - responsive to the multiplexer receiving an enable signal, provide the image stream from the at least one output port of the first processor to the at least one test port via the multiplexer operating in the second state, and
  - responsive to the multiplexer not receiving an enable signal, provide the image stream from the at least one output port of the first processor to the at least one input port of the second processor via the multiplexer operating in the first state.

12. The system of claim 11, wherein:
- the first processor is configured to control an imaging assembly including the image sensor; and
- the second processor is configured to perform one or more machine vision operations on the image stream, and does not control the imaging assembly.

13. The system of claim 11, wherein:
- the at least one output port of the first processor includes at least one Mobile Industry Processor Interface (MIPI) port.

14. The system of claim 11, further comprising instruction that, when executed by the first processor, causes the first processor to:
- responsive to receiving the enable signal at an enable port of the first processor, adjust one or more parameters of the image stream transmitted from the at least one output port of the first processor to the at least one test port.

15. The system of claim 14, wherein:
- the one or more parameters include one or more of a frame rate, exposure, or gain.

16. The system of claim 11, further comprising:
- an optical element of an imaging assembly including the image sensor, the optical element having a position that is adjustable; and
- an active alignment subsystem coupled to the at least one test port and configured to adjust the position of the optical element based at least in part upon receiving the image stream via the at least one test port.

17. A system for sharing an image sensor data stream with an active alignment subsystem, the system comprising:
- an image sensor coupled to a multiplexer, the image sensor configured to provide an image stream from at least one output port of the image sensor to at least one test port via a multiplexer operating in a second state;
- a first processor coupled to a second processor and the multiplexer;
- the multiplexer coupled to the image sensor, the first processor, and at least one test port, the multiplexer configured to:
  - connect at least one input port of the first processor to, and disconnect the at least one test port from, a respective at least one output port of the image sensor when operating in a first state, and
  - connect the at least one test port to, and disconnect the at least one input port of the first processor from, the respective at least one output port of the image sensor when operating in a second state, wherein responsive to receiving an enable signal via an enable port of the multiplexer, the multiplexer operates in the second state, else the multiplexer operates in the first state;

one or more processors; and a memory storing instructions that, when executed by the one or more processors, causes the system to:

responsive to the multiplexer receiving the enable signal, provide the image stream from the at least one output port of the image sensor to the at least one test port via the multiplexer operating in the second state, and responsive to the multiplexer not receiving the enable signal, provide the image stream from the at least one output port of the image sensor to the at least one input port of the first processor via the multiplexer operating in the first state, and provide the image stream from the first processor to the second processor.

18. The system of claim 17, wherein:

the first processor is configured to control an imaging assembly including the image sensor; and the second processor is configured to perform one or more machine vision operations on the image stream, and does not control the imaging assembly.

19. The system of claim 17, wherein:

at least one output port of the first processor includes at least one Mobile Industry Processor Interface (MIPI) port.

20. The system of claim 17, further comprising:

an optical element of an imaging assembly including the image sensor, the optical element having a position that is adjustable; and an active alignment subsystem coupled to the at least one test port and configured to adjust the position of the optical element based at least in part upon receiving the image stream via the at least one test port.

21. A method for sharing an image sensor data stream with an active alignment subsystem, the method comprising:

transmitting an image stream from an image sensor to at least one input port of a first processor of a data capture device including:

the image sensor, a first processor coupled to a multiplexer and the image sensor, and the multiplexer coupled to the first processor, a second processor, and at least one test port, the multiplexer configured to:

connect at least one input port of the second processor to, and disconnect the at least one test port from, a respective at least one output port of the first processor when operating in a first state, and connect the at least one test port to, and disconnect the at least one input port of the second processor from, the respective at least one output port of the first processor when operating in a second state, wherein responsive to receiving an enable signal via an enable port of the multiplexer, the multiplexer operates in the second state, else the multiplexer operates in the first state;

responsive to the multiplexer receiving the enable signal, providing the image stream from the at least one output port of the first processor to the at least one test port via the multiplexer operating in the second state; and responsive to the multiplexer not receiving the enable signal, providing the image stream from the at least one output port of the first processor to the at least one input port of the second processor via the multiplexer operating in the first state.

22. The method of claim 21, wherein:

the first processor is configured to control an imaging assembly of the data capture device including the image sensor; and the second processor is configured to perform one or more machine vision operations on the image stream, and does not control the imaging assembly.

23. The method of claim 21, wherein:

the at least one output port of the first processor includes at least one Mobile Industry Processor Interface (MIPI) port.

24. The method of claim 21, further comprising:

responsive to receiving the enable signal at an enable port of the first processor, adjusting, by the first processor, one or more parameters of the image stream transmitted from the at least one output port of the first processor to the at least one test port.

25. The method of claim 24, wherein:

the one or more parameters include one or more of a frame rate, exposure, or gain.

26. The method of claim 24, wherein:

the data capture device includes an imaging assembly including the image sensor and an optical element having a position that is adjustable, an output of the at least one test port is directed to an active alignment subsystem configured to adjust the position of the optical element; and the method further comprises:

providing, via the at least one test port, the image stream to the active alignment subsystem, and receiving, from the active alignment subsystem, an adjustment to the position of the optical element based at least in part upon receiving the image stream via the at least one test port.

27. A method for sharing an image sensor data stream with an active alignment subsystem, the method comprising:

transmitting an image stream from an image sensor to a multiplexer of a data capture device including:

the image sensor coupled to the multiplexer, a first processor coupled to a second processor and the multiplexer, and the multiplexer coupled to the image sensor, the first processor, and at least one test port, the multiplexer configured to:

connect at least one input port of the first processor to, and disconnect the at least one test port from, a respective at least one output port of the image sensor when operating in a first state, and connect the at least one test port to, and disconnect the at least one input port of the first processor from, the respective at least one output port of the image sensor when operating in a second state, wherein responsive to receiving an enable signal via an enable port of the multiplexer, the multiplexer operates in the second state, else the multiplexer operates in the first state;

responsive to the multiplexer receiving the enable signal, providing the image stream from at least one output port of the image sensor to the at least one test port via the multiplexer operating in the second state; and responsive to the multiplexer not receiving the enable signal, providing the image stream from the at least one output port of the image sensor to the at least one input port of the first processor via the multiplexer operating in the first state, and providing the image stream from the first processor to the second processor.

28. The method of claim 27, wherein:

the first processor is configured to control an imaging assembly of the data capture device including the image sensor; and the second processor is configured to perform one or more machine vision operations on the image stream, and does not control the imaging assembly.

29. The method of claim 27, wherein:

at least one output port of the first processor includes at least one Mobile Industry Processor Interface (MIPI) port.

30. The method of claim 27, wherein:

the data capture device includes an imaging assembly including the image sensor and an optical element having a position that is adjustable, an output of the at least one test port is directed to an active alignment subsystem configured to adjust the position of the optical element; and the method further comprises:

providing, via the at least one test port, the image stream to the active alignment subsystem, and receiving, from the active alignment subsystem, an adjustment to the position of the optical element based at least in part upon receiving the image stream via the at least one test port.

* * * * *